(12) United States Patent
Kanatzidis et al.

(10) Patent No.: US 10,549,270 B2
(45) Date of Patent: Feb. 4, 2020

(54) COLUMN MATERIAL FOR THE CAPTURE OF HEAVY METAL AND PRECIOUS METAL IONS

(71) Applicant: Northwestern University, Evanston, IL (US)

(72) Inventors: Mercouri G. Kanatzidis, Wilmette, IL (US); Debajit Sarma, Chicago, IL (US); Emmanouil Manos, Evanston, IL (US)

(73) Assignee: Northwestern University, Evanston, IL (US)

( * ) Notice: Subject to any disclaimer, the term of this patent is extended or adjusted under 35 U.S.C. 154(b) by 712 days.

(21) Appl. No.: 14/548,952

(22) Filed: Nov. 20, 2014

(65) Prior Publication Data

US 2015/0144568 A1 May 28, 2015

Related U.S. Application Data

(60) Provisional application No. 61/909,669, filed on Nov. 27, 2013.

(51) Int. Cl.
| | |
|---|---|
| *B01D 15/36* | (2006.01) |
| *B01J 39/02* | (2006.01) |
| *C02F 1/28* | (2006.01) |
| *B01J 39/09* | (2017.01) |
| *B01J 47/018* | (2017.01) |
| *C02F 103/34* | (2006.01) |

(Continued)

(52) U.S. Cl.
CPC ............ *B01J 39/02* (2013.01); *B01D 15/361* (2013.01); *B01J 39/09* (2017.01); *B01J 47/018* (2017.01); *C02F 1/288* (2013.01); *C02F 1/42* (2013.01); *C02F 2001/425* (2013.01); *C02F 2101/006* (2013.01); *C02F 2101/20* (2013.01); *C02F 2103/10* (2013.01); *C02F 2103/34* (2013.01)

(58) Field of Classification Search
USPC .................................................. 210/681, 688
See application file for complete search history.

(56) References Cited

U.S. PATENT DOCUMENTS

| | | | |
|---|---|---|---|
| 4,040,917 A | 8/1977 | Whittingham | |
| 4,159,962 A | 7/1979 | Di Salvo et al. | |

(Continued)

FOREIGN PATENT DOCUMENTS

| | | |
|---|---|---|
| WO | WO9836831 | 8/1998 |
| WO | WO2015/080976 | 6/2015 |

OTHER PUBLICATIONS

Manos et al., Layered Metal sulfides capture Uranium from seawater, Sep. 25, 2012, Journal of the American Chemical Society, vol. 134, pp. 16441-16446.*

(Continued)

*Primary Examiner* — Bobby Ramdhanie
*Assistant Examiner* — Michael J An
(74) *Attorney, Agent, or Firm* — Bell & Manning, LLC (57) ABSTRACT

Composite ion-exchange materials for use in an ion-exchange column are provided. Also provided are ion-exchange columns packed with the materials and methods for using the materials to remove metal ions from samples, such as waste water samples. The composite ion-exchange materials comprise a composite material comprising a metal chalcogenide and an alginate, wherein the composite material is mixed with a granular material.

13 Claims, 6 Drawing Sheets

1.00 mm (51) Int. Cl.
*C02F 103/10* (2006.01)
*C02F 101/20* (2006.01)
*C02F 101/00* (2006.01)
*C02F 1/42* (2006.01)

(56) References Cited

U.S. PATENT DOCUMENTS

| | | | |
|---|---|---|---|
| 4,340,496 | A | 7/1982 | Abbott |
| 5,531,936 | A | 7/1996 | Kanatzidis et al. |
| 6,355,175 | B1 | 3/2002 | Green et al. |
| 6,616,860 | B1 | 9/2003 | Onodera et al. |
| 6,919,030 | B2 | 7/2005 | Thorpe et al. |
| 6,989,102 | B1 * | 1/2006 | Park .................. B01J 20/20 210/679 |
| 8,070,959 | B2 | 12/2011 | Kanatzidis et al. |
| 2003/0200839 | A1 | 10/2003 | Jenkins et al. |
| 2008/0145305 | A1 | 6/2008 | Kanatzidis et al. |
| 2009/0057228 | A1 * | 3/2009 | Graham .................. B01J 20/20 210/661 |
| 2010/0260659 | A1 | 10/2010 | Winter |
| 2011/0290735 | A1 | 12/2011 | Kanatzidis et al. |
| 2014/0097141 | A1 | 4/2014 | Kanatzidis et al. |
| 2015/0101980 | A1 * | 4/2015 | Li ...................... C02F 1/288 210/501 |

OTHER PUBLICATIONS

Gok et al., Biosorptin of uranium(VI) from aqueous solution using calcium alginate beads, 2009, Journal of Hazardous Materials, vol. 168, pp. 169-375.*
Mertz et al., Selective removal of Cs, Sr, and Ni by KMS-2 relevant to nuclear waste remediation, ACS Publications, Chemistry of Materials, vol. 25., pp. 2116-2127.*
Manos et al., Layered metal sulfides: Exceptionally selective agents for radioactive strontium removal, PNAS, vol. 105, No. 10, Mar. 11, 2008, pp. 3696-3699.
Ding et al., Permeable layers with large windows in $[(CH_3CH_2CH_2)_2NH_2]_5In_5Sb_6S_{19} \cdot 1.45H_2O$: High ion-exchange capacity, size discrimination, and selectivity for Cs ions, Chem. Mater., vol. 19, Jul. 17, 2007, pp. 3867-3869.
Divigalpitiya et al., Inclusion systems of organic molecules in restacked single-layer molybdenum disulfide, Science, vol. 246, Oct. 20, 1989, pp. 369-371.
Clement et al., Organometallic intercalates of the layered transition-metal dichalcogenides $TaS_2$ and $ZrS_2$, Inorg. Chem., vol. 17, No. 10, American Chemical Society, 1978, pp. 2754-2758.
Heising et al., Exfoliated and restacked MoS2 and WS2: Ionic or neutral species? Encapsulation and ordering of hard electropositive cations., J. Am. Chem. Soc., vol. 121, Dec. 4, 1999, pp. 11720-11732.
Dungey et al., Structural characterization and thermal stability of MoS2 intercalation compounds, Chem. Mater., vol. 10, Jul. 11, 1998, pp. 2152-2161.
Bortun et al., Evaluation of Synthetic Inorganic Ion Exchangers for Cesium and Strontium Removal from Contaminated Groundwater and Wastewater, Solvent Extr. Ion Exch., vol. 15, No. 5, 1997, pp. 909.
Sylvester et al., The Removal of Strontium and Cesium from simulated Hanford Groundwater Using Inorgainc Ion Exchange Materials, Solvent Extr. Ion Exch., vol. 16, No. 6, 1998, pp. 1527.
Bortun et al., Synthesis, Characterization, and Ion Exchange Behavior of a Framework Potassium Titanium Trisilicate $K_2TiSi_3O_9H_2O$ and Its Protonated Phases, Chem. Mater., vol. 12, No. 2, Jan. 13, 2000, pp. 294.
Möller et al., Uptake of 85Sr, 134Cs and 57Co by antimony silicates doped with Ti4+, Nb5+, Mo6+ and W6+, J. Mater. Chem., vol. 11, 2001, pp. 1526.
Mercier et al., Access in Mesoporous Materials: Advantages of a Uniform Pore Structure in the Design of a Heavy Metal Ion Adsorbent for Environmental Remediation, Adv. Mater., vol. 9, No. 6, 1997, pp. 500.
Feng et al.,Functionalized Monolayers on Ordered Mesoporous Supports, Science, vol. 276, May 9, 1997, pp. 923.
Gash et al., Efficient Recovery of Elemental Mercury from Hg(II)-Contaminated Aqueous Media Using a Redox-Recyclable Ion-Exchange Material, Environ. Sci. Technol., vol. 32, No. 7, 1998, pp. 1007.
International Search Report and Written Opinion issued in PCT/US08/11550, dated Dec. 12, 2008.
Manos et al., H2xMnxSn3-xS6 (x=0.11-0.25): A Novel Reusable Sorbent for Highly Specific Mercury Capture Under Extreme pH Conditions, Adv. Funct. Mater., vol. 19, 2009, pp. 1087-1092.
Manos et al., Sequestration of Heavy Metals from Water with Layered Metal Sulfides, Chem. Eur. J., vol. 15, 2009, pp. 4779-4784.
Manos et al., Highly Efficient and Rapid Cs+ Uptake by the Layered Metal Sulfide K2xMnxSn3-xS6 (KMS-1), J. Am. Chem. Soc., vol. 131, Apr. 17, 2009, pp. 6599-6607.
Manos et al., Layered Metal Sulfides Capture Uranium from Seawater, J. Am. Chem. Soc., vol. 134, Sep. 25, 2012, pp. 16441-16446.
Mertz et al., Selective Removal of Cs+, Sr2+, and Ni2+ by K2xMgxSn3—xS6 (x=0.5-1) (KMS-2) Relevant to Nuclear Waste Remediation, Chem. Mater., vol. 25, May 15, 2013, pp. 2116-2127.
International Search Report and Written Opinion issued in PCT Application No. PCT/US2014/066882, dated Mar. 16, 2015.
Extended European Search Report mailed in European Application No. 14866622.5, dated Jul. 3, 2017.

* cited by examiner

COLUMN MATERIAL FOR THE CAPTURE OF HEAVY METAL AND PRECIOUS METAL IONS

CROSS-REFERENCE TO RELATED APPLICATIONS

The present application claims priority to U.S. Provisional Patent Application No. 61/909,669 that was filed Nov. 27, 2013, the entire contents of which are hereby incorporated by reference.

REFERENCE TO GOVERNMENT RIGHTS

This invention was made with government support under DMR1104965 awarded by the National Science Foundation. The government has certain rights in the invention.

BACKGROUND

Oxide based compounds, such as clays and zeolites, are commonly used inorganic ion-exchange materials. Layered metal chalcogenide based materials also can be used for a variety of ion-exchange applications. However, some ion-exchange applications, such as industrial heavy water and nuclear waste treatment processes, require a continuous bed flow ion-exchange column. Due to their small particle size, layered metal chalcogenide based materials do not allow sufficient flow through a column and therefore, are poorly suited for ion-exchange column applications.

SUMMARY

A composite ion-exchange material for use in an ion-exchange column is provided. Also provided are ion-exchange columns packed with the material and methods for using the materials to remove metal ions from samples, such as waste water samples. The composite ion-exchange materials comprise a composite material comprising a metal chalcogenide and an alginate mixed with a granular material.

Methods of using the materials for the remediation of unwanted metal ions from a sample include the steps of passing a sample comprising the metal ions through a column, such as a fixed bed flow column, containing the material, whereby ion-exchange occurs between the chalcogenide and the metal ions in the sample; and collecting the sample exiting the column.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings.

DETAILED DESCRIPTION

Figure 6:
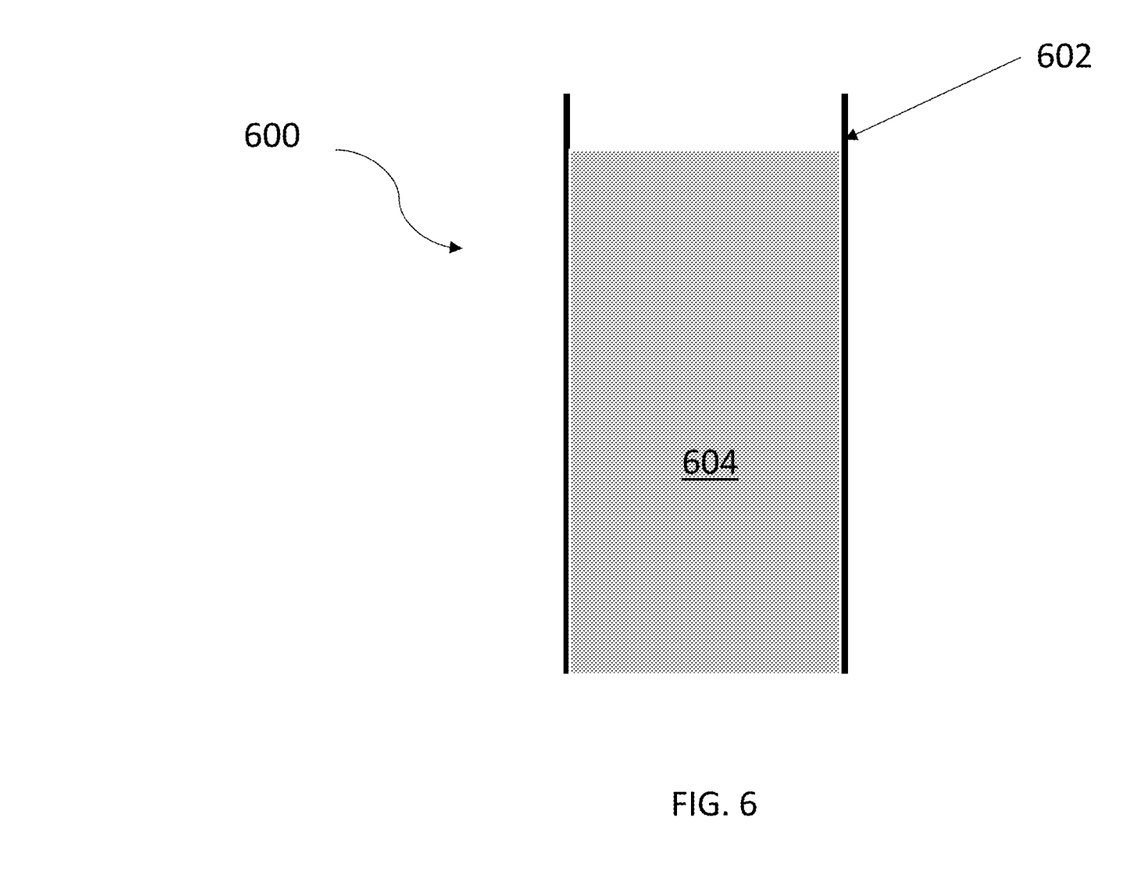
FIG. 6 shows an ion-exchange column 600 that includes a column 602 and an ion-exchange material 604 packing the column.

The present ion-exchange materials include a composite material comprising a layered metal chalcogenide and an alginate. As shown in FIG. 6, a mixture of this composite material with an inert granular phase provides an ion-exchange material 604 for packing into the column 602 an ion-exchange column 600.

Figure 1A:
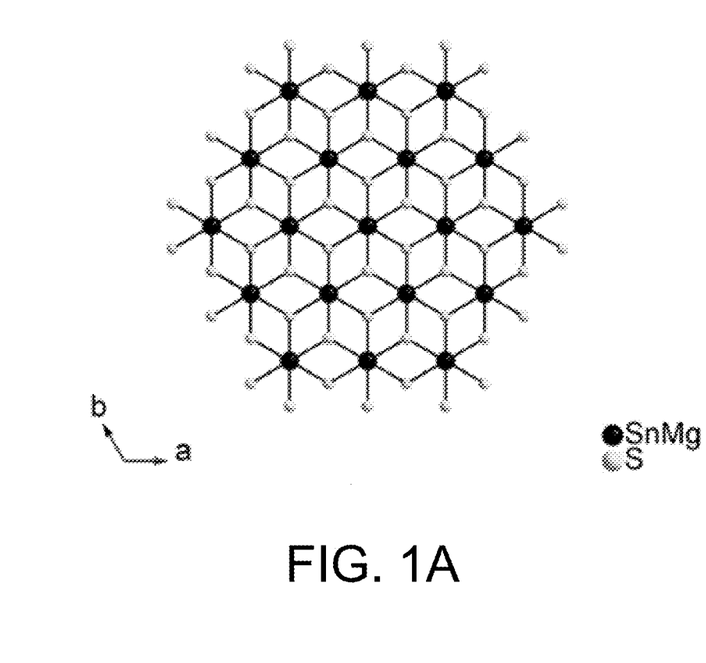
FIG. 1(A) shows the layer framework of KMS-2 viewed down the c-axis. The Mg/Sn and S atoms are represented by black and grey balls respectively.
Figure 1B:
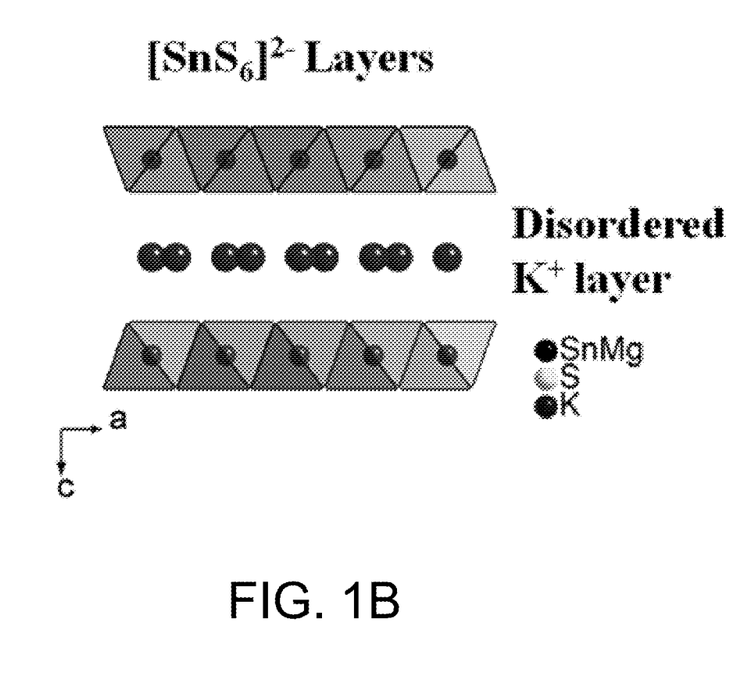
FIG. 1(B) shows a view of the KMS-2 structure along the c-axis with the disordered $K^+$ ions (larger balls) in the interlayer space.

The metal chalcogenides are layered structures with loosely bound interlayer cations. Examples include metal chalcogenides of the nominal formula $A_{2x}M_xSn_{3-x}S_6$, where x has a value in the range from about 0.5 to about 1 (including, for example, x values in the range from about 0.5 to about 0.95); A is $Li^+$, $Na^+$, $K^+$, $Rb^+$ or $Cs^+$; and M is $Mg^{2+}$, $Ca^{2+}$, $Mn^{2+}$, $Mn^{3+}$, $Zn^{2+}$, $Fe^{2+}$ or $Fe^{3+}$. The $A_{2x}M_xSn_{3-x}S_6$ materials have a layered structure that is built up by edge-sharing "M,Sn" $S_6$ octahedra. The M and Sn atoms occupy the same crystallographic position and the sulfur atoms are three-coordinated. The $A^+$ ions are positionally disordered and intercalated between the layers. The structure of the $A_{2x}M_xSn_{3-x}S_6$ metal chalcogenides, viewed down the c-axis and along the c-axis is shown in FIGS. 1(A) and 1(B), respectively. Suitable alginates for use in forming the composite materials include sodium alginate.

Granular materials that may be mixed with the metal chalcogenide-alginate composite material include inert granular materials (that is, granular materials that do not interfere with the ion-exchange process), such as activated carbon or sand (silica powder). The grain size and amount of the granular material can be selected to provide an appropriate flow rate for a given application. By way of illustration, in some embodiments, the ratio of metal chalcogenide-alginate composite material to granular material is in the range from about 1:3 to 3:1. This includes embodiments in which the ratio is in the range from about 1:2 to 2:1 and further includes embodiments in which the ratio is in the range from about 1:1.5 to 1.5 to 1. Illustrative mesh sizes for the granular material include those in the range from about 15 to 75.

The ion-exchange materials can be used to remove a variety of metal ions from a fluid sample, including ions of metals that pose an environmental and/or health risk. Thus, examples of fluid samples that can be remediated by the present methods include, drinking water and waste water generated from a nuclear reactor, an industrial plant or from mining processes, such as ore leaching. Examples of metal ions that can be removed from the samples include heavy metal ions and precious metal ions. Metal ions that can be removed using the ion-exchange materials include $Co^{2+}$, $Ni^{2+}$, $Ag^+$, $Hg^{2+}$, $Cd^{2+}$, $Pb^{2+}$, $Pd^{2+}$, $Pt^{2+}$, and $UO_2^{2+}$.

EXAMPLE

This example illustrates the use of an ion-exchange material comprising a composite of nominal formula $K_{2-x}Mg_xSn_{3-x}S_6$ ("KMS-2") and sodium alginate mixed with activated carbon or sand in the remediation of aqueous solutions containing various metal ions.

In this example, a fixed bed column with packed with the KMS-2-alginate composite and activated carbon (20-40 mesh) in 1:1 ratio. The total mass of the exchanged material is 4 g. The bed volume of the column was about 5.4 mL, which was calculated as follows: Bed volume=[bed height (cm)×cross sectional area (cm²)]; and for the column, cross sectional area=$\pi r^2$, where, r=radius of the column. For the column used here the bed height was 14 cm and r was 0.35 cm, so the bed volume was 5.385 mL.

Experimental

Example of Synthesis of $K_{2-x}Mg_xSn_{3-x}S_6$ (KMS-2) (x=0.5-1)

Hydrothermal synthesis: Elemental Sn (1.88 mol, 223.0 g), Mg (0.94 mol, 22.8 g), S (6.57 mol, 210.83 g), $K_2CO_3$ (1.41 mol, 194.72 g), water (500 mL) were mixed in a 1 L beaker. The beaker was kept inside a 1 gallon Parr autoclave and heated slowly to 180° C. and kept for 6 hours. Then, the autoclave was allowed to cool at room temperature. A bright yellow polycrystalline product was isolated by filtration (275 g, yield≈55%), washed several times with water and acetone and dried under vacuum. Electron Dispersive Spectroscopy (EDS) analysis showed the presence of K, Mg, Sn and S and gave the average formula "$K_{1.3}Mg_{0.6}Sn_{2.6}S_{6.0}$".

Example of Synthesis of KMS-2-Alginate Composite

An amount of 0.2 g of sodium alginate was dissolved in 400 mL of warm water, and then the solution was allowed to cool. To the alginate solution 10 g of KMS-2 was added. 10 g of $CaCl_2$ was dissolved in 200 ml of water and then it was poured into the alginate-KMS-2 with continuous stirring. The product was then isolated by filtration, washed with water and acetone and vacuum dried. Electron Dispersive Spectroscopy (EDS) analysis shows the presence of Mg, Ca, Sn and S and gave a ratio of Mg:Ca:Sn:S=1.8:0.6:2.8:6.

Preparation of the Column.

2 g of KMS-2-alginate composite and 2 g of activated carbon (20-40 mesh) were ground in a mortar and pestle and filled in a glass column. Similarly another column was prepared by using sand (50-70 mesh) instead of activated carbon.

Ion-Exchange Studies.

A typical ion-exchange experiment of KMS-2 with various ions was conducted as follows: Two bed volumes of the solution (10.8 mL) were passed through the column and collected at the bottom in a conical propylene tube. Similarly a number of bed volumes were passed through the column and collected.

Physical Measurements.

Figure 2:
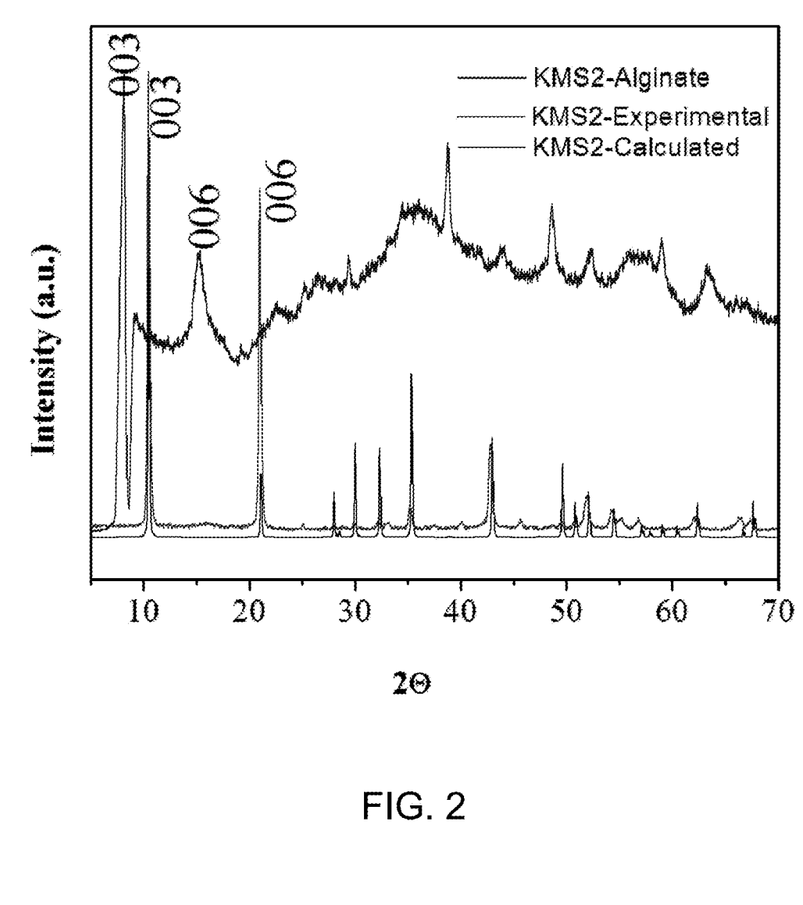
FIG. 2 shows the powder X-ray diffraction patterns of KMS-2 (experimental and calculated) and a KMS-2-alginate composite.

Powder patterns were collected by spreading the ground sample on a glass slide using a CPS 120 INEL X-ray powder diffractometer with a graphite monocromated Cu Kα radiation operating at 40 kV and 20 mA. FIG. 2 shows the powder X-ray diffraction pattern of KMS-2 and a KMS-2-alginate composite.

Figure 3A:
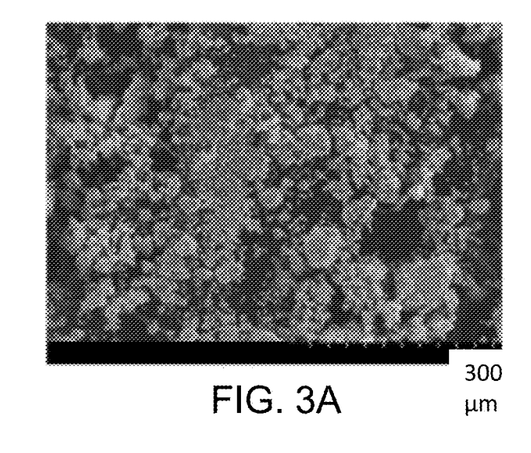
FIG. 3(A) is an SEM image of pristine KMS-2.
Figure 3B:
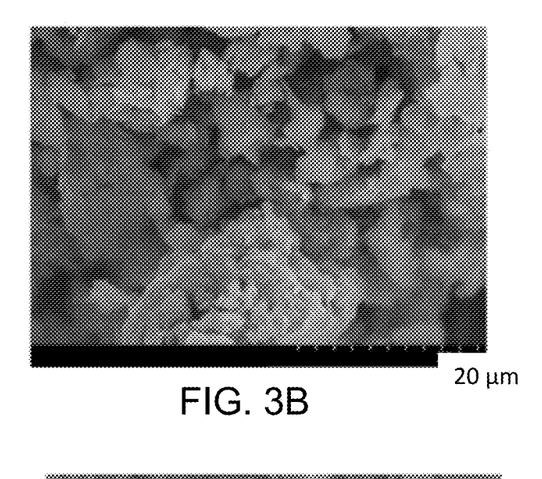
FIG. 3(B) is an SEM image of the pristine KMS-2 at a higher magnification.
Figure 3C:
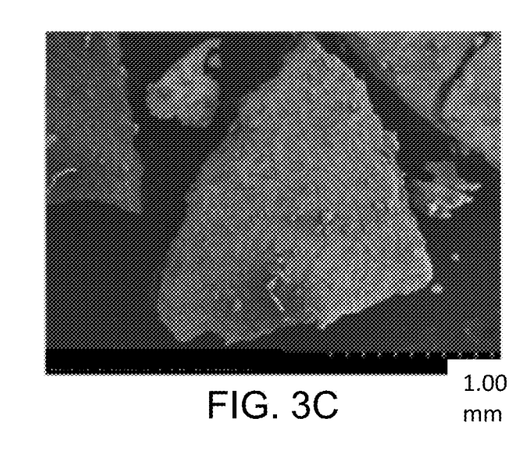
FIG. 3(C) is an SEM image of a KMS-2-alginate composite.
Figure 3D:
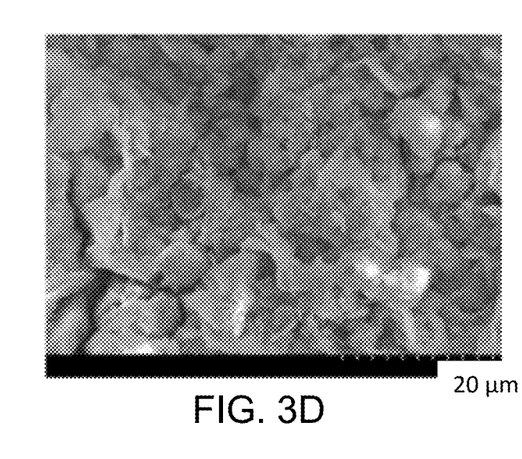
FIG. 3(D) is an SEM image of the KMS-2-alginate composite at a higher magnification.

The energy dispersive spectroscopy (EDS) analyses were performed using a Hitachi S-3400N-II scanning electron microscope (SEM) equipped with an ESED II detector for elemental analysis. Data acquisition was performed with an accelerating voltage of 20 kV and 60 s acquisition time. FIG. 3(A) is an SEM image of the pristine KMS-2. FIG. 3(B) is an SEM image of the pristine KMS-2 at a higher magnification. FIG. 3(C) is an SEM image of the KMS-2-alginate composite. FIG. 3(D) is an SEM image of the KMS-2-alginate composite at a higher magnification.

The $Ag^+$ ion-exchange samples were analyzed by Inductively Coupled Plasma-Atomic Emission Spectroscopy (ICP-AES) using VISTA MPX CCD SIMULTANEOUS ICP-OES instrument.

The multi ion solution ($Co^{2+}$, $Ni^{2+}$, $Hg^{2+}$ and $Pb^{2+}$) after ion-exchange was analyzed with Inductively Coupled Plasma-Mass Spectroscopy (ICP-MS) using a computer-controlled ThermoFisher X Series II Inductively Coupled Plasma Mass Spectrometer with a quadruple setup equipped with Collision Cell Technology.

Results.

Figure 4:
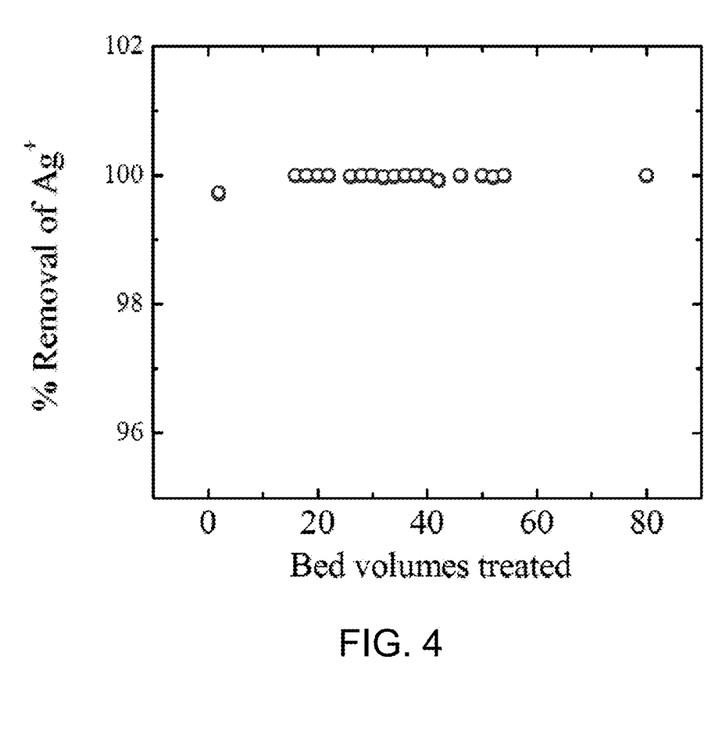
FIG. 4 is a plot of the bed volumes treated vs. the percentage removal of $Ag^+$ ion for an ion-exchange column loaded with a metal chalcogenide and an alginate mixed with a granular material.

The fixed bed column made with the 1:1 KMS-2-alginate and activated carbon ion-exchange material showed exceptional removal of $Ag^+$ ions. A solution of 100 PPM of Ag+ passed through the column showed more than 99% by weight removal of the Ag+ ion from the solution (Table 1). FIG. 4 is a plot of the bed volumes treated vs. the percentage removal of $Ag^+$ ion for an ion-exchange column loaded with the 1:1 KMS-2-alginate and activated carbon ion-exchange material.

TABLE 1

$Ag^+$ ion-exchange using the fixed bed column with 1:1 KMS-2-alginate and activated carbon ion-exchange material.

| ID | Bed volumes Treated | mL | Initial concentration (PPM) | Final Concentration (PPM) | % Removal |
|---|---|---|---|---|---|
| 1 | 2 | 10.8 | 102.59 | 0.2888 | 99.718 |
| 2 | 16 | 10.8 | 102.59 | 0.0056 | 99.995 |
| 3 | 18 | 10.8 | 102.59 | 0.0025 | 99.998 |
| 4 | 20 | 10.8 | 102.59 | 0.0012 | 99.999 |
| 5 | 22 | 10.8 | 102.59 | 0.0053 | 99.995 |
| 6 | 26 | 10.8 | 102.59 | 0.0134 | 99.987 |
| 7 | 28 | 10.8 | 102.59 | 0.0075 | 99.993 |
| 8 | 30 | 10.8 | 102.59 | 0.004 | 99.996 |
| 9 | 32 | 10.8 | 102.59 | 0.0277 | 99.973 |
| 10 | 34 | 10.8 | 102.59 | 0.0137 | 99.987 |
| 11 | 36 | 10.8 | 102.59 | 0.0061 | 99.994 |
| 12 | 38 | 10.8 | 102.59 | 0.0093 | 99.991 |
| 13 | 40 | 10.8 | 102.59 | 0.0011 | 99.999 |
| 14 | 42 | 10.8 | 102.59 | 0.0849 | 99.917 |
| 15 | 46 | 10.8 | 102.59 | 0.0044 | 99.996 |
| 16 | 50 | 10.8 | 102.59 | 0.0028 | 99.997 |
| 17 | 52 | 10.8 | 102.59 | 0.0281 | 99.973 |
| 18 | 54 | 10.8 | 102.59 | 0.0088 | 99.991 |
| 19 | 80 | 10.8 | 102.59 | 0.0074 | 99.993 |

Figure 5:
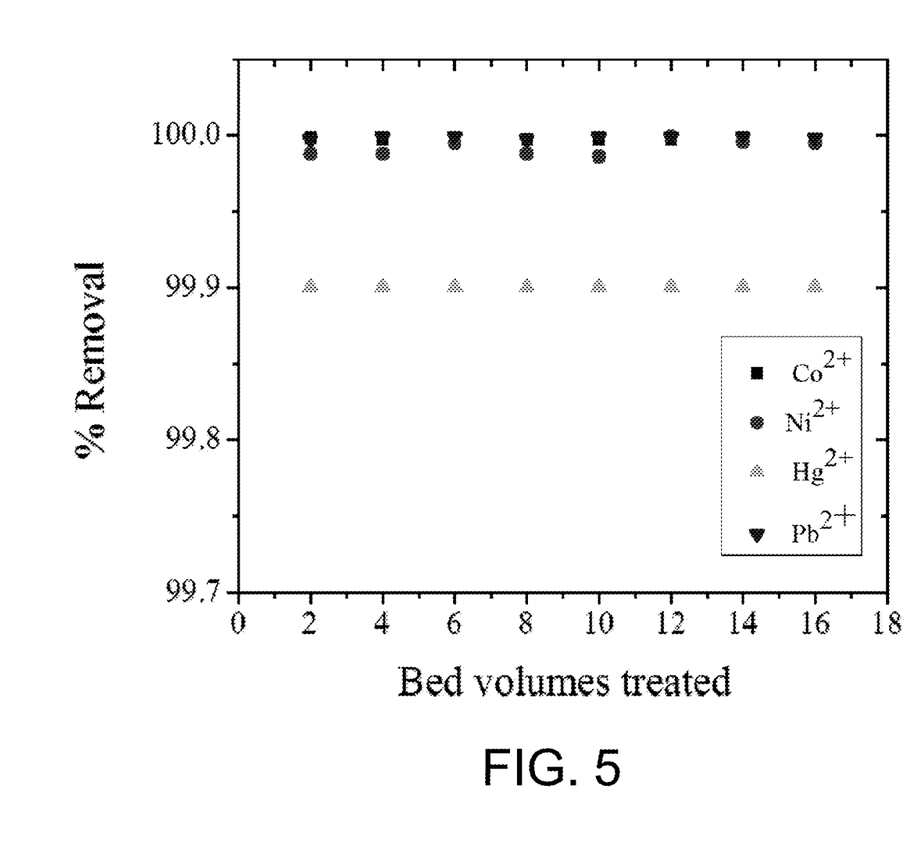
FIG. 5 is a plot of the bed volumes treated vs. the percentage removal of $Co^{2+}$, $Ni^{2+}$, $Hg^{2+}$ and $Pb^{2+}$ ions for an ion-exchange column loaded with a metal chalcogenide and an alginate mixed with a granular material.

The fixed bed column was also tested with a solution of mixed ions ($Co^{2+}$, $Ni^{2+}$, $Hg^{2+}$ and $Pb^{2+}$) at low concentration (~2 PPM) to check its efficiency at low concentration level. The result shows that it removed more than 99.9% by weight of all the ions (Table 2). FIG. 5 is a plot of the bed volumes treated vs. the percentage removal of $Co^{2+}$, $Ni^{2+}$, $Hg^{2+}$ and $Pb^{2+}$ ions for an ion-exchange column loaded with the 1:1 KMS-2-alginate and activated carbon ion-exchange material.

TABLE 2

Removal of $Co^{2+}$, $Ni^{2+}$, $Hg^{2+}$ and $Pb^{2+}$ from a mixture using the fixed column with 1:1 KMS-2-alginate and activated carbon ion-exchange material.

| ID | Bed volumes Treated | mL | Initial Concentration (PPB) | Final Concentration (PPB) | % Removal |
|---|---|---|---|---|---|
| $Co^{2+}$ | | | | | |
| 1 | 2 | 10.8 | 2159.47 | 0.037 | 99.998 |
| 2 | 4 | 10.8 | 2159.47 | 0.057 | 99.997 |
| 3 | 6 | 10.8 | 2159.47 | 0.058 | 99.997 |
| 4 | 8 | 10.8 | 2159.47 | 0.063 | 99.997 |
| 5 | 10 | 10.8 | 2159.47 | 0.064 | 99.997 |
| 6 | 12 | 10.8 | 2159.47 | 0.057 | 99.997 |
| 7 | 14 | 10.8 | 2159.47 | 0.06 | 99.997 |
| 8 | 16 | 10.8 | 2159.47 | 0.083 | 99.996 |
| $Ni^{2+}$ | | | | | |
| 1 | 2 | 10.8 | 2420.52 | 0.288 | 99.988 |
| 2 | 4 | 10.8 | 2420.52 | 0.287 | 99.988 |
| 3 | 6 | 10.8 | 2420.52 | 0.114 | 99.995 |
| 4 | 8 | 10.8 | 2420.52 | 0.287 | 99.988 |
| 5 | 10 | 10.8 | 2420.52 | 0.338 | 99.986 |
| 6 | 12 | 10.8 | 2420.52 | 0.024 | 99.999 |
| 7 | 14 | 10.8 | 2420.52 | 0.078 | 99.996 |
| 8 | 16 | 10.8 | 2420.52 | 0.114 | 99.995 |
| $Hg^{2+}$ | | | | | |
| 1 | 2 | 10.8 | 1492.63 | <1 | >99.9 |
| 2 | 4 | 10.8 | 1492.63 | <1 | >99.9 |
| 3 | 6 | 10.8 | 1492.63 | <1 | >99.9 |
| 4 | 8 | 10.8 | 1492.63 | <1 | >99.9 |
| 5 | 10 | 10.8 | 1492.63 | <1 | >99.9 |
| 6 | 12 | 10.8 | 1492.63 | <1 | >99.9 |
| 7 | 14 | 10.8 | 1492.63 | <1 | >99.9 |
| 8 | 16 | 10.8 | 1492.63 | <1 | >99.9 |
| $Pb^{2+}$ | | | | | |
| 1 | 2 | 10.8 | 2273.157 | 0.051 | 99.997 |
| 2 | 4 | 10.8 | 2273.157 | 0.021 | 99.999 |
| 3 | 6 | 10.8 | 2273.157 | 0.01 | 99.999 |
| 4 | 8 | 10.8 | 2273.157 | 0.065 | 99.997 |
| 5 | 10 | 10.8 | 2273.157 | 0.016 | 99.999 |
| 6 | 12 | 10.8 | 2273.157 | 0.012 | 99.999 |
| 7 | 14 | 10.8 | 2273.157 | 0.012 | 99.999 |
| 8 | 16 | 10.8 | 2273.157 | 0.026 | 99.998 |

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. An ion-exchange column comprising:
   a column; and
   an ion-exchange material packing the column, the ion-exchange material comprising a mixture of:
     particles of a composite material, each of the particles of the composite material comprising a metal chalcogenide and an alginate, wherein the metal chalcogenide is characterized in that the metal chalcogenide undergoes ion exchange with metal ions in a sample, when the sample is passed through the column; and
     a granular phase comprising grains of an inert material, wherein grains of the inert material are not part of the particles of the composite material.

2. The ion-exchange column of claim 1, wherein the metal chalcogenide has the nominal formula $A_{2x}M_xSn_{3-x}S_6$, where x has a value in the range from about 0.5 to about 1; A is $Li^+$, $Na^+$, $K^+$, $Rb^+$ or $Cs^+$; and M is $Mg^{2+}$, $Ca^{2+}$, $Mn^{2+}$, $Mn^{3+}$, $Zn^{2+}$, $Fe^{2+}$ or $Fe^{3+}$.

3. The ion-exchange column of claim 2, wherein the metal chalcogenide has the nominal formula $K_{2x}M_xSn_{3-x}S_6$.

4. The ion-exchange column of claim 2, wherein the weight ratio of particles of the composite material to the grains of inert material is in the range from about 1:3 to 3:1.

5. The ion-exchange column of claim 4, wherein the grains of inert material comprise activated carbon, sand or silica powder.

6. The ion-exchange column of claim 1, wherein the weight ratio of the particles of the composite material to the grains of the inert material is in the range from about 1:3 to 3:1.

7. The ion-exchange material of claim 1, wherein the grains of inert material are activated carbon, sand or silica powder.

8. The ion-exchange material of claim 1, wherein the grains of inert material have a mesh size in the range from about 15 to about 75.

9. A method of removing metal ions from a sample comprising the metal ions, the method comprising passing the sample through the ion-exchange column of claim 1, whereby ion-exchange occurs between the metal chalcogenide and the metal ions in the sample; and collecting the sample exiting the column.

10. The method of claim 9, wherein the metal chalcogenide has the nominal formula $A_{2x}M_xSn_{3-x}S_6$, where x has a value in the range from about 0.5 to about 1; A is $Li^+$, $Na^+$, $K^+$, $Rb^+$ or $Cs^+$; and M is $Mg^{2+}$, $Ca^{2+}$, $Mn^{2+}$, $Mn^{3+}$, $Zn^{2+}$, $Fe^{2+}$ or $Fe^{3+}$.

11. The method of claim 9, wherein the sample is waste water from a nuclear reactor, an industrial plant or a mining operation.

12. The method of claim 10, wherein the percentage of the metal ions removed is at least 99.9 wt. %.

13. The ion-exchange material of claim 1, wherein the particles of the composite material include particles having diameters greater than 1 mm, but less than 7 mm.

* * * * *